United States Patent
Allione

(10) Patent No.: US 8,408,700 B2
(45) Date of Patent: Apr. 2, 2013

(54) METHOD FOR CALCULATING A CUSTOMIZED PROGRESSIVE ADDITION SURFACE; METHOD FOR MANUFACTURING A PROGRESSIVE ADDITION LENS

(75) Inventor: Pascal Allione, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 103 days.

(21) Appl. No.: 12/997,872

(22) PCT Filed: Jun. 11, 2009

(86) PCT No.: PCT/EP2009/057246
§ 371 (c)(1),
(2), (4) Date: Dec. 13, 2010

(87) PCT Pub. No.: WO2009/150206
PCT Pub. Date: Dec. 17, 2009

(65) Prior Publication Data
US 2011/0085134 A1     Apr. 14, 2011

(30) Foreign Application Priority Data
Jun. 12, 2008   (EP) .................................. 08305250

(51) Int. Cl.
*G02C 7/02*   (2006.01)

(52) U.S. Cl. .............................. 351/159.74; 351/159.41
(58) Field of Classification Search ............. 351/159.05, 351/159.06, 159.41, 159.42, 159.73–159.77
See application file for complete search history.

(56) References Cited

U.S. PATENT DOCUMENTS

| | | | | |
|---|---|---|---|---|
| 4,307,945 A | * | 12/1981 | Kitchen et al. ........... | 351/159.42 |
| 4,786,160 A | * | 11/1988 | Furter ...................... | 351/159.42 |
| 6,074,062 A | * | 6/2000 | Morris et al. ............ | 351/159.42 |
| 2007/0035696 A1 | | 2/2007 | Altheimer et al. | |

FOREIGN PATENT DOCUMENTS

| | | |
|---|---|---|
| WO | WO 97/26579 | 7/1997 |
| WO | WO 02/084381 | 10/2002 |
| WO | WO 2005/036238 | 4/2005 |
| WO | WO 2007/017766 | 2/2007 |

* cited by examiner

*Primary Examiner* — Darryl J Collins
(74) *Attorney, Agent, or Firm* — Cozen O'Connor

(57) ABSTRACT

A method for calculating a customized progressive addition surface S''' of a progressive addition lens (PAL) made of a material having an optical index of n, the method, comprising at least the successive steps of: a) providing N initial progressive addition surfaces where $N \geq 1$, b) calculating N intermediate surfaces $S'_k$ by flattening each initial progressive addition surfaces $S_k$, c) calculating a transformed intermediate surface S'', d) calculating the customized progressive addition surface S''' by cambering the transformed intermediate surface S''.

16 Claims, 13 Drawing Sheets

METHOD FOR CALCULATING A CUSTOMIZED PROGRESSIVE ADDITION SURFACE; METHOD FOR MANUFACTURING A PROGRESSIVE ADDITION LENS

RELATED APPLICATIONS

This is a U.S. national stage of application No. PCT/EP2009/057246, filed on Jun. 11, 2009.

This application claims the priority of European application no. 08305250.6 filed Jun. 12, 2008, the entire content of which is hereby incorporated by reference.

FIELD OF THE INVENTION

The invention relates to a process for calculating a customized progressive addition surface of a progressive addition lens (PAL), and to a manufacturing method of a progressive addition lens customized using the method according to the invention.

BACKGROUND OF THE INVENTION

Conventional progressive addition lenses are lenses which have a far vision zone, a near vision zone, and a progressive corridor (or channel) there between. The progressive corridor provides a gradual power progression from the far vision zone to the near vision zone without dividing line or prismatic jump.

Generally, the dispensing of a particular progressive addition lens to a wearer involves selecting a progressive addition lens design from a range of available progressive addition lens designs based on certain visual requirements of the wearer.

The selection method may involve selecting a progressive addition lens having a peripheral design which the wearer is comfortable with and thus suitable for the wearer. However, although the selected progressive addition lens may have a peripheral design which is suitable for the wearer, other features, such as the inset, the corridor length, also called length of progression, may not be optimal for the wearer's visual requirements or non compatible with the wearer's spectacle frame.

Indeed, in a selection method which involves selecting a particular progressive addition lens surface design from a range of progressive addition lens designs, a progressive addition lens design having a suitable peripheral design together with other design features, such as the inset, the corridor length, which are related to the requirements of the wearer may not be available.

SUMMARY OF THE INVENTION

Accordingly, it would be a significant advantage if a progressive addition lens design was able to be dispensed to a wearer such that the selected progressive addition lens design had a suitable peripheral design as well as design features which are more closely related to the requirements of the wearer. For example, a progressive addition lens design could have design features which have been individually customized for a wearer.

Accordingly, it is an object of the present invention to provide a method for calculating a customized progressive addition surface of a progressive addition lens.

One aspect of the invention relates to a method for calculating a customized progressive addition surface $S'''$ of a progressive addition lens (PAL) made of a material having an optical index of n, the method comprising at least the successive steps of:

a) providing N initial progressive addition surfaces where $N \geq 1$, each initial progressive addition surface, $S_k$, where $1 \leq k \leq N$, being provided with characteristic data comprising:

$M_k$ points, $P_{k,i}$, where $1 \leq i \leq M_k$, the sphere $Sph(P_{k,i})$, the cylinder $Cyl(P_{k,i})$ and the axe Axe $(P_{k,i})$ at each point $P_{k,i}$ the near vision point $P_{k,nv}$, and the far vision point $P_{k,fv}$, and selecting for each initial progressive addition surface $S_k$ a reference point $P_{k,r}$ among the $M_k$ points $P_{k,i}$ of each initial progressive addition surface, b) calculating N intermediate surfaces $S'_k$ by flattening each initial progressive addition surfaces $S_k$ so as to have for each intermediate surface $S'_k$ the value of the Sphere $Sph(P_{k,fv})$ at the far vision point smaller or equal to 1 diopter and the Sphere $Sph(P_{k,nv})$ at the near vision point smaller or equal to 1 diopter, c) calculating a transformed intermediate surface $S''$ by applying $$S''(P_i) = \sum_{k=1}^{N} \alpha_k T_{P_{k,r};\epsilon_k}(S'_k(P_{i,k})),$$

where $T_{P_{k,r};\epsilon_k}$ is an isotropic function applied to each point $P_{k,i}$ of each intermediate surface $S'_k$ and $\alpha_k$ a coefficient specific to each intermediate surface $S'_k$, each isotropic function $T_{P_{k,r};\epsilon_k}$ is defined by the selected reference point $P_{k,r}$ of the intermediate surface $S'_k$, and a scaling parameter $\epsilon_k$, with $\epsilon_k \neq 1$ when $N=1$, d) calculating the customized progressive addition surface $S'''$ by cambering the transformed intermediate surface $S''$ so as to have the desired value of the sphere in at least two points of the customized surface $S'''$.

Advantageously, such method allows calculating a customized progressive addition surface of a progressive addition lens.

According to further embodiments, of the method according to the invention, which can be considered alone or in combination:

step b) is processed by calculating N intermediate surfaces $S'_k$ from the triples $(Sph'(P_{k,i}); Cyl'(P_{k,i}); Axe'(P_{k,i}))$, where $Sph'(P_{k,i})$, $Cyl'(P_{k,i})$, $Axe'(P_{k,i})$, are the values of the sphere, the cylinder and the axe at each point $P_{k,i}$ of each intermediate surface $S'_k$, and are calculated according to:

$Sph'(P_{k,i}) = a_k * Sph(P_{k,i}) + b_k$ $Cyl'(P_{k,i}) = a_k * Cyl(P_{k,i})$ $Axe'(P_{k,i}) = Axe(P_{k,i})$, where the requirements of equations (1) and (2) are fulfilled for each intermediate surface $S'_k$:

$$0 < a_k \leq \frac{1}{|Sph(P_{k,fv}) - Sph(P_{k,nv})|}, \quad (1)$$

where $Sph(P_{k,nv})$ and $Sph(P_{k,fv})$ represent the values of the sphere of each initial progressive addition surface $S_k$ at the near vision point $P_{k,nv}$ and at the far vision point $P_{k,fv}$, and $-\alpha_k * Sph(P_{k,fv}) < b_k \leq 2 - \alpha_k * Sph(P_{k,fv}); \quad (2)$ step d) is processed by calculating the customized progressive addition surface S''' from the triples (Sph''' ($P_i$); Cyl''' ($P_i$); Axe''' ($P_i$)), where Sph''' ($P_i$), Cyl''' ($P_i$) and Axe''' ($P_i$) are the values of the sphere, the cylinder and the axe of each point $P_i$ of the customized progressive addition surface S''' and are calculated according to:

$$Sph'''(P_i) = c*Sph''(P_i) + d$$

$$Cyl'''(P_i) = c*Cyl''(P_i)$$

$$Axe'''(P_i) = Axe''(P_i),$$

where c and d are constants chosen so to have the desired value of the sphere in at least two points of the customized surface S''';

at least one of the isotropic function $T_{P_{k,r}; \epsilon_k}$ is selected so as to have:

$$T_{P_{k,r}; \epsilon_k}(S_k'(P_{i,k}) = S_k'(\epsilon_k(x_k - x_{k,r}) + x_{k,r}, \epsilon_k(y_k - y_{k,r}) + y_{k,r})/\epsilon_k^2$$

where each point ($x_k$, $y_k$) and the reference point ($x_{k,r}$, $y_{k,r}$) of each intermediate surface $S_k'(x_k, y_k)$, and each point of the transformed intermediate surface $S_k''(x_k, y_k)$ are expressed in a Cartesian coordinate system;

the constant c and d are selected so as to have the value of the sphere of the customized progressive addition surface S''' at the near and far vision points equal to desired values;

at least one of the initial progressive addition surfaces $S_k$ is provided with a point density of at least 0.3 points/mm²;

N initial progressive addition surfaces are provided with N>1, and wherein every scaling parameter $\epsilon_k$=1;

only one initial progressive addition lens surface S is provided, the initial progressive addition lens surface is provided with at least a point of interest POI;

the scaling parameter $\epsilon$ is calculated according to $$\varepsilon = \frac{(w_r - w'_{poi})}{(w_r - w''_{poi})},$$

with $w_r$ the position of the reference point $P_r$ according to a w-axis, $W_{poi}'$ the position according to the w-axis of the point of interest POI on the intermediate lens surface and $W_{poi}''$ the customized position according to the w-axis of the point of interest POI on the transformed intermediate surface;

the point of interest is chosen from the list comprising the far vision point, the near vision point, the fitting cross, the PRP;

the progressive addition lens (PAL) is made of a material having an optical index of n comprised between 1.4 and 2;

the point of interest is the far vision point and the reference point is the near vision point or the point of interest is the near vision point and the reference point is the far vision point.

According to embodiments of the invention where N=1, the customization may be done, for example, by calculating the position of at least a point of interest of an optical surface of a progressive addition lens while keeping the same surface design.

According to embodiments of the invention where N>1, the customization may be done by combining different surface designs together in order to obtain an optical surface of a progressive addition lens taking advantage of a plurality of already known surface designs.

According to another aspect, the invention relates to a method according to the invention for adjusting the length of progression of a progressive addition lens, wherein the point of interest is either the far vision point or the near vision point.

The invention also relates to a method according to the invention for adjusting the inset of a progressive addition lens, wherein the point of interest is either the far vision point or the near vision point.

The invention further relates to a method for calculating an optical system, wherein the optical system is identified by an optical function, at least two optical surfaces comprise a first optical surface defined by a first equation and a second optical surface defined by a second equation, the optimization step further comprises:

a generating step, in which a virtual optical system is used to generate a virtual function;

a modification step, in which the virtual function is modified so as to obtain the function;

a calculation step, in which the second equation is calculated from the function, and the first equation, wherein one of the first or second optical surfaces is a customized progressive addition surface S''' calculated using a method according to the invention.

According to another aspect, the invention relates to a computer program product comprising one or more stored sequence of instruction that is accessible to a processor and which, when executed by the processor, causes the processor to carry out the steps of a method according to the invention and to a computer readable medium carrying one or more sequences of instructions of the computer program product according to the invention.

Unless specifically stated otherwise, as apparent from the following discussions, it is appreciated that throughout the specification discussions terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the framework of the invention, the following terms have the meanings indicated herein below:

optical axis of the progressive addition lens: direction perpendicular to the front face of the lens and passing through the optical center or the prism reference point (PRP) for the case of the progressive lens of the latter;

far vision zone: zone of the lens that surrounds the far vision point, and within which the local optical characteristics of optical power and of astigmatism of the lens are substantially identical to those at the far vision point;

near vision zone: zone of the lens that surrounds the near vision point, and within which the local optical characteristics of optical power and of astigmatism of the lens are substantially identical to those of the near vision point;

addition of a progressive addition lens: difference between the value of optical power of the lens at the near vision point and that at the far vision point;

optical characteristics of a progressive addition lens: data on optical power, astigmatism, aberration, etc., relating to the modifications of a light beam that passes through the progressive addition lens;

prescription: set of optical characteristics of optical power, of astigmatism and, where relevant, of addition, determined by an ophthalmologist in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription for a progressive addition lens comprises values of optical power and of astigmatism at the distance-vision point and, where appropriate, an addition value;

surface characteristics of a progressive addition lens: geometrical data relating to one face of the lens, such as values of average sphere or of cylinder, for example;

"height" is used to define a lens or a lens zone dimension corresponding to a vertical when the sight is horizontal;

"width" is used to define a lens or a lens zone dimension corresponding to a horizontal when the sight is horizontal.

"Near vision point" is well known from the person skilled in the art, an example of definition may be: the point of a surface of a progressive addition lens through which the sight of the wearer passes when said wearer is in a reading position.

the wording "a reading position" is widely used for a man skilled in the art of vision correction and has to be understood as a reading position where the object to be read is situated between 25 to 50 cm from the eye or more generally from spectacles plan of the reader (see for example: "Le nouveau Dictionnaire de la vision"— Michel Millodot—Médiacom Vision Editeur).

As for an example, the reading position is the Harmon distance which is defined as being the optimal working distance where the physiological energy of the reading position corresponds to a minimum.

According to Harmon (publications dated 1951 and 1958) this position is determined when the head and the trunk are maintained in a minimum muscular activity, then reducing the tensions.

It has to be understood that a "reading position" according to the present invention is such a reading position and is not an intermediate or far vision reading position, such as for example when watching a computer screen or reading an advertisement.

"Far vision point" is well known from the person skilled in the art, an example of definition may be: the point of a surface of a progressive addition lens through which the sight of the wearer passes when said wearer looks at infinity and where the values of the Sphere, cylinder and Axe correspond to the wearer's prescription for far vision.

A "surface design" is a widely used wording known from the man skilled in the art to designate the set of parameters allowing to define an optical function of an generic optical system; each ophthalmic lens manufacturer has its own designs, particularly for aspherical lens and for progressive addition lenses.

In the sense of the embodiment of the invention where N=1, the surface design is a mathematical definition based on an equivalence relation.

Unless specifically stated otherwise, an equivalence relation is a binary relation between two elements of a set which groups them together as being "equivalent".

A relation "#" is to be considered as an equivalence relation if it is reflexive, symmetric, and transitive. In other words, the following must hold for "#" to be an equivalence relation on X:

Reflexivity for any a part of X: a # a

Symmetry for any a and b part of X:

if a # b then b # a

Transitivity for any a, b and c part of X:

if a # b and b # c then a # c.

The equivalence class a under "#", denoted [a], is the subset of X whose elements b are such that a#b.

Therefore in the sense of the embodiment of the invention where N=1, two optical surfaces S1 and S2 are considered as having the same design if and only if:

(a) there is a combination of translation and rotation which applied to S1 gives S2, or (b) there is a triplet (length of progression Lp, sphere at the near vision point Sph(nv), sphere at the far vision point Sph(fv)) such that S2=S1(Lp,Sph(nv),Sph(fv)), where S1(Lp,Sph(nv),Sph(fv))represents the customized surface S''' obtained from a initial surface S by a method according to an embodiment of the invention where N=1, and with a converging to 0 and with b converging to −Sph(fv) of the initial surface, or (c) S2 is a combination of the two previous transformations.

In other words, if S is a progressive addition surface by the surface design associate to S, it is referred to the equivalence class of S according to the equivalent relation defined by the relations (a), (b) and (c).

From such definition of a surface design of a progressive addition surface, it is possible to define what is called in the present application as "the distance between two surface designs". Such distance can be calculated, for example by:

$$D(S1, S2) = \sqrt{\frac{\iint\limits_{Domain} (\Delta Ch(x, y)^2 + \Delta Cv(x, y)^2 + \Delta Cd(x, y)^2) dx dy}{A}}$$

where ΔCh, ΔCv and ΔCd represent respectively the differences of horizontal, vertical, diagonal curvatures of the two progressive addition surfaces and A the area of the integration domain. The integration domain should comprise the far and near vision point.

In the sense of the invention, two progressive addition surfaces are considered having the same surface design when the distance between the surface designs is least or equal to 0.1 D for a 40 mm diameter surface.

BRIEF DESCRIPTION OF THE DRAWINGS

Non limiting embodiments of the invention will now be described with reference to the accompanying drawings wherein.

DETAILED DESCRIPTION OF THE DRAWINGS

Figure 1:
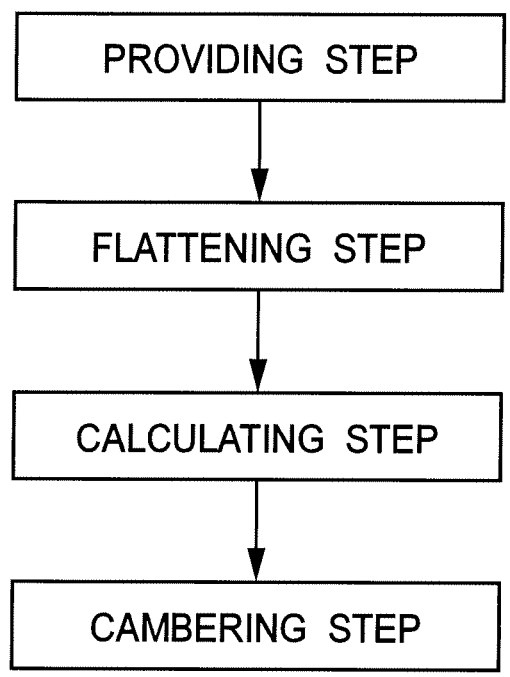
FIG. 1. is a schematic representation of the main steps of a method according to an embodiment of the invention.

The present invention relates to a method for calculating a customized progressive addition surface of a progressive addition lens (PAL) made of a material having an optical index of n, comprising the successive steps of:
  a) providing N initial progressive addition surfaces, where N≧1;
  b) flattening each initial progressive addition surface in order to obtain N intermediate surfaces;
  c) calculating from the N intermediate surfaces thus obtained, a transformed intermediate surface; and
  d) cambering the transformed intermediate surface thus obtained in order to obtain a customized progressive addition surface.

The optical index n of the progressive ophthalmic lens may be a constant or a variable. For example, if the progressive ophthalmic lens is composed of different material the optical index of the progressive ophthalmic lens may be composed of the different optical index of the materials.

According to an embodiment of the invention, the providing step a) comprises providing each initial progressive addition surfaces, $S_k$, where 1≦k≦N, with characteristic data comprising:
  Mk points, $P_{k,i}$, where 1≦i≦$M_k$,
  the sphere Sph($P_{k,i}$), the cylinder Cyl($P_{k,i}$) and the axe Axe($P_{k,i}$) at each point $P_{k,i}$
  the near vision point $P_{k,nv}$, and
  the far vision point $P_{k,fv}$.

According to an embodiment of the invention, the Mk points may be provided in the form of the equation of a surface Sk, such as B-Splines tensorial product, nurbs and Zernike polynomial.

According to an embodiment of the invention, each progressive addition surface $S_k$, has a circular shape with a diameter of 60 mm. The number $M_k$ of points $P_{k,i}$ provided for at least one, for example each, initial progressive addition surface $S_k$, is at least of 500, for example at least of 1500, for example at least of 3000.

According to an embodiment of the invention, the point density of at least one, for example each, of the provided initial progressive addition surfaces $S_k$, is of at least 0.3 point/mm$^2$, for example at least 1 point/mm$^2$, for example 5 points/mm$^2$.

According to an embodiment of the invention, the providing step a) comprises selecting for each initial progressive addition surface $S_k$ a reference point $P_{k,r}$ among the $M_k$ points $P_{k,i}$ of each initial progressive addition surface.

Each initial progressive addition surfaces $S_k$, may present an surface design selected according to the requirements of the wearer.

The providing step a) according to the invention may also comprise providing a desired position of at least a point of interest of at least one initial progressive addition surface.

The point of interest may be chosen from the list comprising: the far vision point, the near vision point, the fitting cross, the PRP, or by any point the wearer may wish to customise the position.

The providing step according to the invention may also comprise providing the desired values of the sphere in at least two points of the customized progressive addition surface. For example, the providing step a) may comprise providing the desired values of the sphere at the near and far vision points of the customized progressive addition surface. The providing step a) may also comprise providing the value of the sphere at the near vision point and the value of the addition of the customized progressive addition surface.

According to an embodiment of the invention, at least one of the initial progressive addition surfaces $S_k$ is provided with a sampling interval of I, for example I=2 mm. For the at least one initial progressive addition surface provided with a sampling interval of I, the values of the sphere Sph($P_{k,i}$), the cylinder Cyl($P_{k,i}$), and the axe Axe($P_{k,i}$) at a point $P_{k,i}$ of the at least one initial progressive addition surface with a sampling interval of for example at most $$\frac{I}{2}$$

or for example at most I/4.

$$\frac{I}{4}.$$

According to an embodiment of the invention, the flattening step b) may be processed by calculating N intermediate surfaces $S'_k$ from the triples (Sph'($P_{k,i}$); Cyl'($P_{k,i}$); Axe'($P_{k,i}$)), where Sph'($P_{k,i}$), Axe'($P_{k,i}$), are the values of the sphere, the cylinder and the axe at each point $P_{k,i}$ of each intermediate surface $S'_k$, and are calculated according to:

$$\text{Sph}'(P_{k,i}) = a_k * \text{Sph}(P_{k,i}) + b_k$$

$$\text{Cyl}'(P_{k,i}) = a_k * \text{Cyl}(P_{k,i})$$

$$\text{Axe}'(P_{k,i}) = \text{Axe}(P_{k,i}),$$

where the requirements of equations (1) and (2) are fulfilled for each intermediate surface $S'_k$:

$$0 < a_k \le \frac{1}{\text{Sph}(P_{k,fv}) - \text{Sph}(P_{k,nv})}, \quad (1)$$

where $\text{Sph}(P_{k,nv})$ and $\text{Sph}(P_{k,fv})$ represent the values of the sphere of each initial progressive addition surface $S_k$ at the near vision point $P_{k,nv}$ and at the far vision point $P_{k,fv}$, and $$-\alpha_k * \text{Sph}(P_{k,fv}) < b_k \le 2 - \alpha_k * \text{Sph}(P_{k,fv}). \quad (2)$$

According to an embodiment of the invention for at least one, for example all, intermediate surface $S'_k$, $a_k$ is selected to fulfill the requirements of equation:

$$0 < a_k \le \frac{1}{2(\text{Sph}(P_{k,fv}) - \text{Sph}(P_{k,nv}))}. \quad (1')$$

According to an embodiment of the invention for at least one, for example all, intermediate surface $S'_k$, $b_k$ is selected to fulfill the requirements of equation:

$$-\alpha_k * \text{Sph}(P_{k,fv}) < b_k \le 1 - \alpha_k * \text{Sph}(P_{k,fv}). \quad (2')$$

Advantageously equation (1), respectively (1'), is such that the addition of each, respectively at least one, intermediate surface $S'_k$ is less or equal to 1 dioptre, respectively less or equal to 0.5 dioptre.

Advantageously, equation (2), respectively (2'), is so that the value of the sphere at the far vision point of each, respectively at least one, intermediate surface $S'_k$ is less or equal to 2 dioptres, respectively less or equal to 1 dioptre.

According to the requirements of equation (1) and (2), respectively (1') and (2'), each, respectively at least one, for example all, of the intermediate surface, may have a curvature smaller or equal to the curvature of the initial progressive addition surface from which it is calculated.

According to an embodiment of the invention, each intermediate surface is calculated from the triples $(\text{Sph}'(P_{k,i}); \text{Cyl}'(P_{k,i}); \text{Axe}'(P_{k,i}))$, for example by a double integration process.

An example of such double integration process is described in U.S. Pat. No. 6,955,433.

The calculating step c) according to an embodiment of the invention may comprise calculating a transformed intermediate surface $S''$ by applying $$S''(P_i) = \sum_{k=1}^{N} \alpha_k T_{P_{k,r}; \varepsilon_k}(S'_k(P_{i,k})),$$

where $T_{P_{k,r}; \varepsilon_k}$ is an isotropic function applied to each point $P_{k,i}$ of each intermediate surface $S'_k$ and $\alpha_k$ a coefficient specific to each intermediate surface $S'_k$, each isotropic function $T_{P_{k,r}; \varepsilon_k}$ is defined by the selected reference point $P_{k,r}$ of the intermediate surface $S'_k$, and a scaling parameter $\varepsilon_k$, with $\varepsilon_k \ne 1$ when $N=1$.

The isotropic function $T_{P_{k,r}; \varepsilon_k}$ may be selected so as to have:

$$T_{P_{k,r}; \varepsilon_k}(S_k'(P_{i,k})) = S_k'(\varepsilon_k(x_k - x_{k,r}) + x_{k,r}, \varepsilon_k(y_k - y_{k,r}) + y_{k,r}) / \varepsilon_k^2$$

where each point $(x_k, y_k)$ and the reference point $(x_{k,r}, y_{k,r})$ of each intermediate surface $S_k'(x_k, y_k)$, and each point of the transformed intermediate surface $S_k''(x_k, y_k)$ are expressed in a Cartesian coordinate system.

The method according to the invention further comprises a cambering step d). The cambering step d) may be processed by calculating the customized progressive addition surface $S'''$ from the triples $(\text{Sph}'''(P_i); \text{Cyl}'''(P_i); \text{Axe}'''(P_i))$, where $\text{Sph}'''(P_i)$, $\text{Cyl}'''(P_i)$ and $\text{Axe}'''(P_i)$ are the values of the sphere, the cylinder and the axe of each point $P_i$ of the customized progressive addition surface $S'''$, and are calculated according to:

$$\text{Sph}'''(P_i) = c * \text{Sph}''(P_i) + d$$

$$\text{Cyl}'''(P_i) = c * \text{Cyl}''(P_i)$$

$$\text{Axe}'''(P_i) = \text{Axe}''(P_i),$$

where c and d are constants chosen so as to have the desired value of the sphere in at least two points of the customized progressive addition surface $S'''$.

The constants c and d may be selected so as to have the value of the sphere of the customized progressive addition surface $S'''$ at the near and far vision points equal to desired values.

According to an embodiment of the invention, the constants c and d may be chosen so as to have the values of the sphere at the far vision point and at the near vision point which correspond to the prescription of the wearer.

The method according to the invention may also comprise a step of calculating the customized progressive addition surface from the triples $(\text{Sph}'''(P_i); \text{Cyl}'''(P_i); \text{Axe}'''(P_i))$. Such calculation may be done by double integration, such as disclosed in U.S. Pat. No. 6,955,433.

Examples of Embodiments Where N=1

According to an embodiment of the invention, the providing step a) may comprise providing only one initial progressive addition surface, i.e. N=1.

The initial progressive addition surface may be provided with a point of interest POI.

Advantageously, such an embodiment provides a method for calculating a customized progressive addition surface of a progressive addition lens (PAL), by customizing the position of at least a point of interest of the progressive addition surface of the progressive addition lens so as to have an optical surface which has been individually customized for a wearer.

The flattening step b) may be carried out as described previously, providing an intermediate surface $S'$.

Further to the flattening step b), the method according to the invention may comprise a step c) of calculating a transformed intermediate surface $S''$ by applying to each point $P_i$ of the intermediate surface $S'$ an isotropic function $T_{P_r}, \varepsilon$ defined by a reference point $P_r$ different from the point of interest POI and a scaling parameter $\varepsilon$. The scaling parameter $\varepsilon$ may be adjusted in order to customize the position of the point of interest POI.

According to an embodiment of the invention the scaling parameter $\varepsilon$ may be calculated according to:

$$\varepsilon = \frac{(w_r - w'_{POI})}{(w_r - w''_{POI})},$$

with $w_r$ the position of the reference point $P_r$ according to a w-axe, $w'_{POI}$ the position according to the w-axe of the point of interest POI on the intermediate surface and $w''_{POI}$ the customized position according to the w-axe of the point of interest POI on the transformed intermediate surface S".

According to an embodiment of the invention the w-axes can be either the x-axe or the y-axe of a Cartesian coordinate system of the initial progressive addition lens surface.

According to an embodiment of the invention, the isotropic function $T_{P_r},\epsilon$ used during the scaling transforming step may be:

$$T_{P_r;\epsilon}(S'(P_i) = S'(\epsilon(x-x_r)+x_r,\epsilon(y-y_r)+y_r)/\epsilon^2$$

where each point (x, y) and the reference point $(x_r, y_r)$ of the intermediate surface S'(x,y), and each point of the transformed intermediate surface S"(x,y) are expressed in a Cartesian coordinate system.

According to such embodiment of the invention, the scaling parameter e may be chosen equal to:

$$\varepsilon = \frac{(x_r - x'_{POI})}{(x_r - x''_{POI})},$$

with $x_r$ the position of the reference point according to the x-axes, $x'_{POI}$ the position according to the x-axes of the point of interest POI on the intermediate surface S'(x,y) and $x''_{POI}$ the customized position according to the x-axes of the point of interest POI on the transformed intermediate surface S"(x,y).

According to an embodiment of the invention the scaling parameter may be chosen equal to:

$$\varepsilon = \frac{(y_r - y'_{POI})}{(y_r - y''_{POI})},$$

with $y_r$ the position of the reference point according to the y-axes, $y'_{POI}$ the position according to the y-axes of the point of interest POI on the intermediate surface S'(y,y) and $y''_{POI}$ the customized position according to the y-axes of the point of interest POI on the transformed intermediate surface S"(y,y).

Advantageously, such a scaling parameter s allows rescaling the intermediate surface without changing the second derivate of the surface.

During the flattening step b) the initial progressive addition surface is flattened to an intermediate surface flat so as to have the curvature of the intermediate surface almost equal to its second directives.

Therefore, it is possible to apply the isotropic function $T_{P_r},\epsilon$ to the intermediate surface without changing the curvature of the surface, and without adding cylinder to the surface. Therefore, the combination of the flattening step b) and the calculating step c) allows customizing the position of at least a point of interest without changing the surface design of the initial progressive addition lens.

According to an embodiment of the invention, the point of interest may be the far vision point and the reference point may be the near vision point.

According to another embodiment of the invention, the point of interest may be the near vision point and the reference point may be the far vision point.

The cambering step d) described previously may apply to an embodiment where N=1.

Examples of Embodiments Where N>1

According to an embodiment of the invention, the providing step a) may comprise providing N initial progressive addition surfaces with N>1, and the scaling parameters $\epsilon_k$ may be chosen as equal to 1 for all the surfaces.

According to such embodiment, the N initial progressive addition surfaces are flattened according to step b) of a method according to the invention.

According to such embodiment, the isotropic function $T_{P_{k,r}};1$ used during the calculation step c), is the identity function. Therefore, the calculation step c) consists in calculating a transformed intermediate surface S" by applying $$S''(P_i) = \sum_{k=1}^{N} \alpha_k S'_k(P_{i,k}),$$

where $\alpha_k$ is a coefficient specific to each intermediate surface $S'_k$.

The cambering step d) can be carried out as described previously.

Advantageously such embodiment of the invention may be used to customize a surface design for a customized progressive addition surface. Indeed, the linear combination of given surface designs may be used to customized a new surface design.

Without being bound by a theory the inventors believe that the linear combination of given surface designs gives a customized progressive addition acceptable surface design. Indeed, as the intermediate surfaces $S'_k$ are flattened, the linear combination of such surfaces is equal to the linear combination of their local curvature. Therefore, it is possible to calculate a transformed surface by combining the intermediate surface designs and when the intermediate surface is cambered according to step d) it may have a surface design acceptable for the wearer.

EXAMPLE

The invention may be illustrated by the following example.

In this example, the method according to the invention has been applied to a single initial progressive addition surface referenced "confort orma, base 5.50, addition 2.2, optical index n=1.502, the coordinates of the near vision point being (2.5, −14) mm and the coordinates of the far vision point being (0,8) mm."

In this example, the points $P_i$ of the initial progressive addition surface are expressed in a Cartesian coordinate system whose origin is the optical centre of the initial progressive addition surface. The x-axis is selected so has to have the optical centre and the far vision point on the x-axis.

The points Pi of the initial progressive addition surface are provided with the sampling interval of 2 mm over the full surface.

The near vision point of the initial addition surface has its y-coordinate equal to −14mm.

In this example, the inventors have customized the y-coordinates of the near vision point, while keeping the same surface design. The inventors have used a method according to the invention with the far vision point as reference point and the near vision point as point of interest.

Table 1, reports the desired customized y-coordinates of the near vision point and the calculated scaling parameter e required for the calculation step c).

TABLE 1

| Reference | Customized y-coodinates (mm) | ε |
|---|---|---|
| A | −14 | 1 |
| B | −6 | 1.8 |
| C | −8 | 1.5 |
| D | −10 | 1.286 |
| E | −12 | 1.125 |
| F | −16 | 0.9 |
| G | −18 | 0.818 |
| H | −20 | 0.75 |

In this example, a progressive addition surface with the "confort orma" design has been provided during the providing step a).

During the flattening step b), the constants a and b have been chosen to have the value, a=0.25 and b=−0.8.

A selection of such values for constants a and b, allows having the sphere of the intermediate surface at the near vision point equal to 1 dioptre and the sphere of the intermediate surface at the far vision point equal to 0.5 dioptre.

During the calculating step c), the reference point $(x_r, Y_r)$ is chosen to be the far vision.

The scaling parameters e reported in table 1 have been calculated according to the customized y-coordinate of the near vision point.

In this example, the cambering step d) is carry out with the constants c and d chosen so as to have the values of the sphere at the near vision point and far vision point of the customized progressive addition surface equal to the values of the initial progressive addition surface, that is c=4, and d=0.8.

Figure 2A:
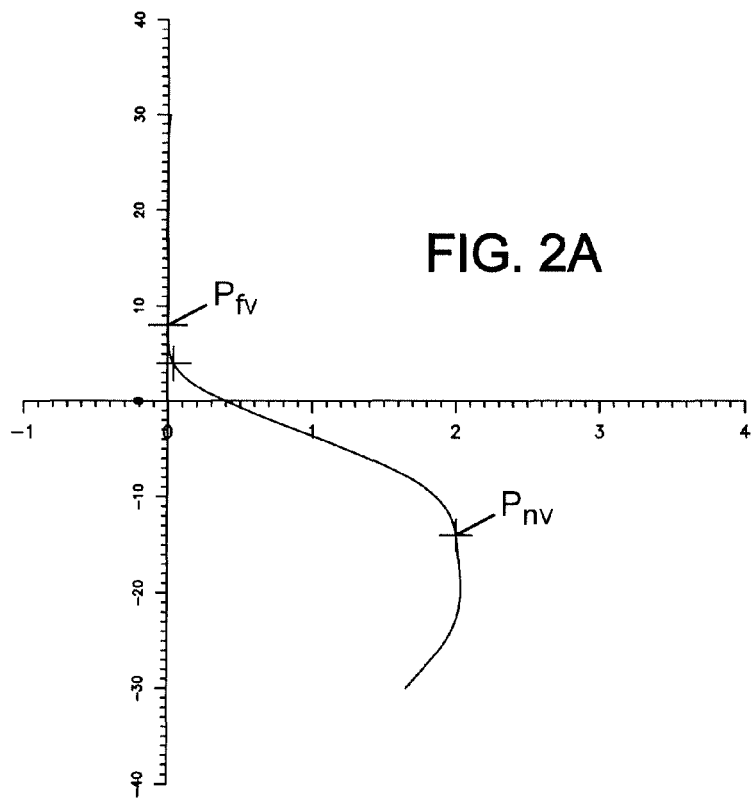
FIG. 2A is a representation of the power profile of a progressive addition surface.
Figure 2B:
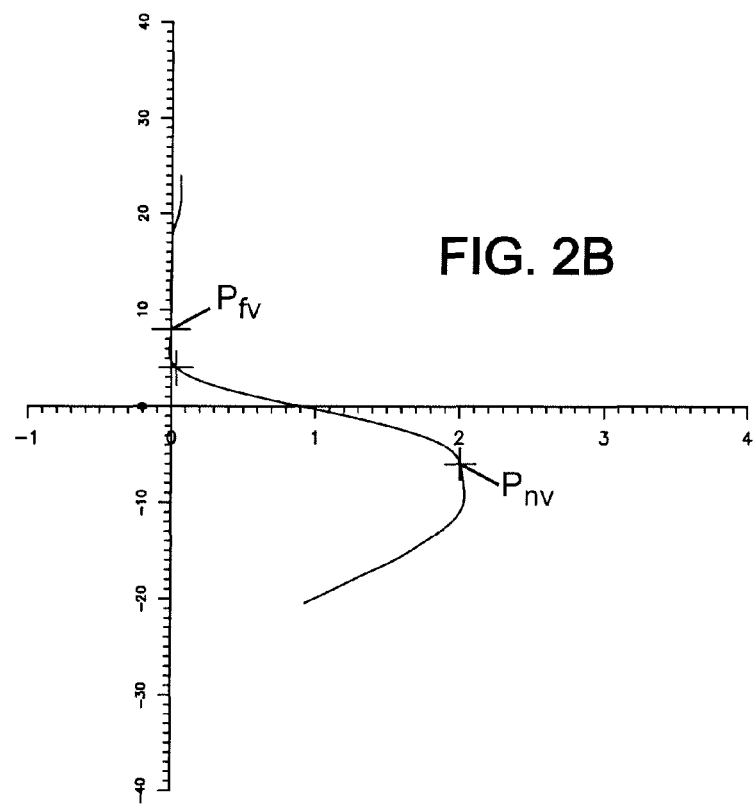
FIGS. 2B to 2H are representations of the power profile of customized progressive addition surfaces obtained by a method according to an embodiment of the invention.
Figure 2C:
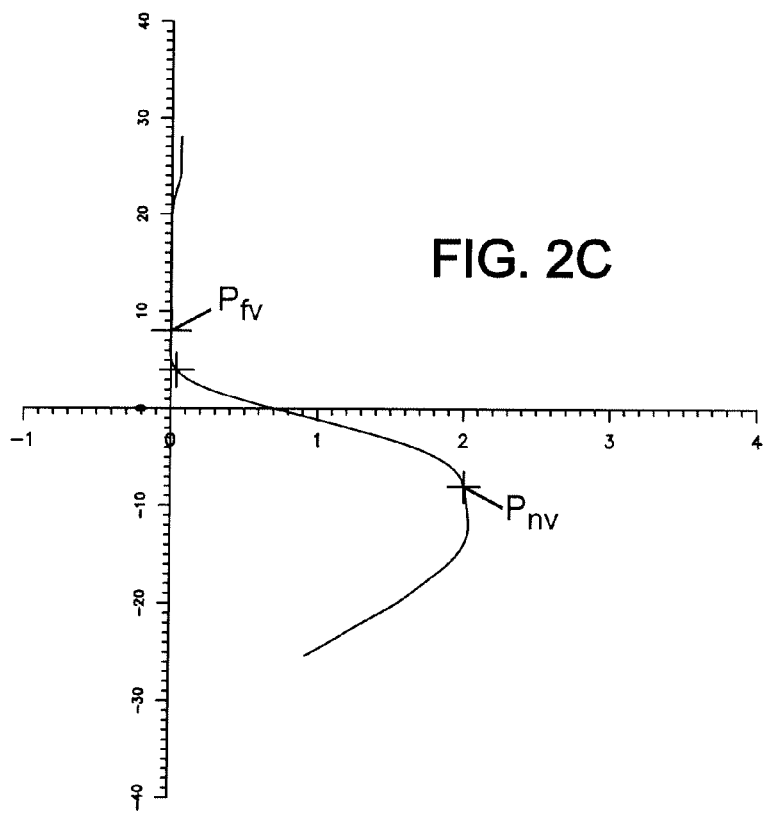
Figure 2D:
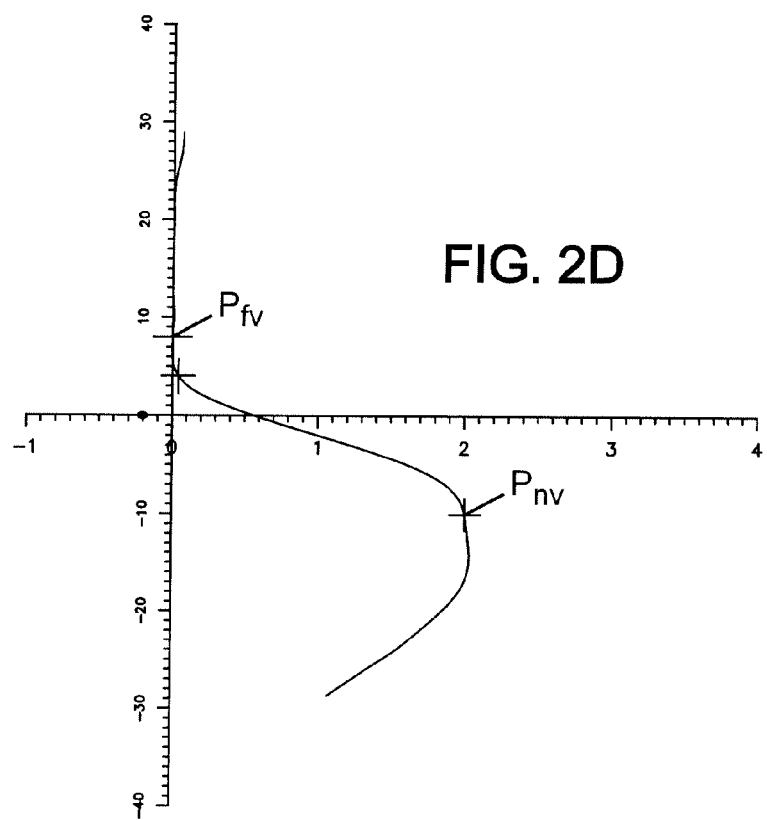
Figure 2E:
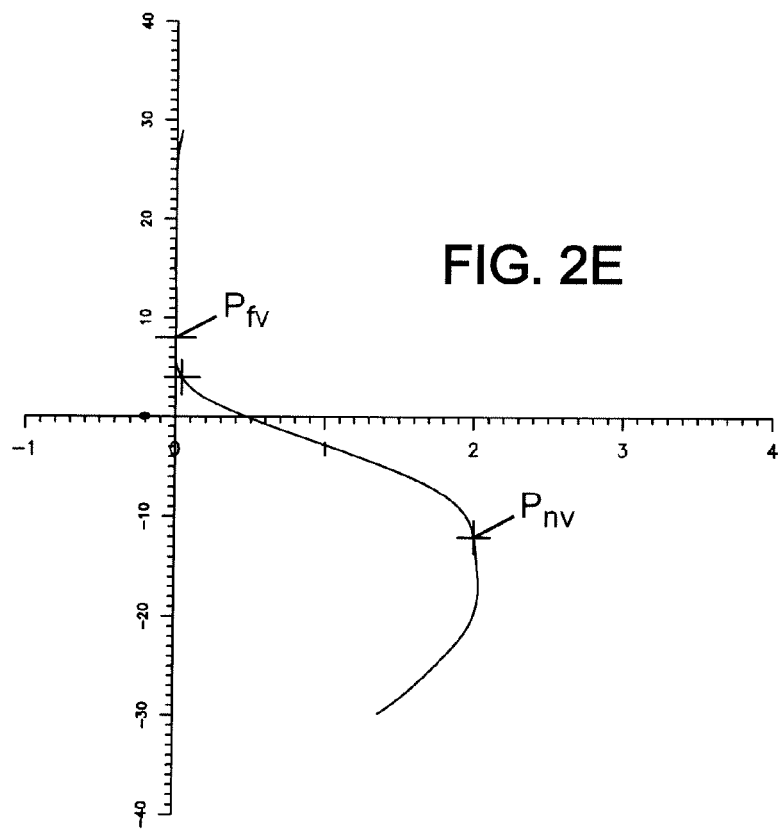
Figure 2F:
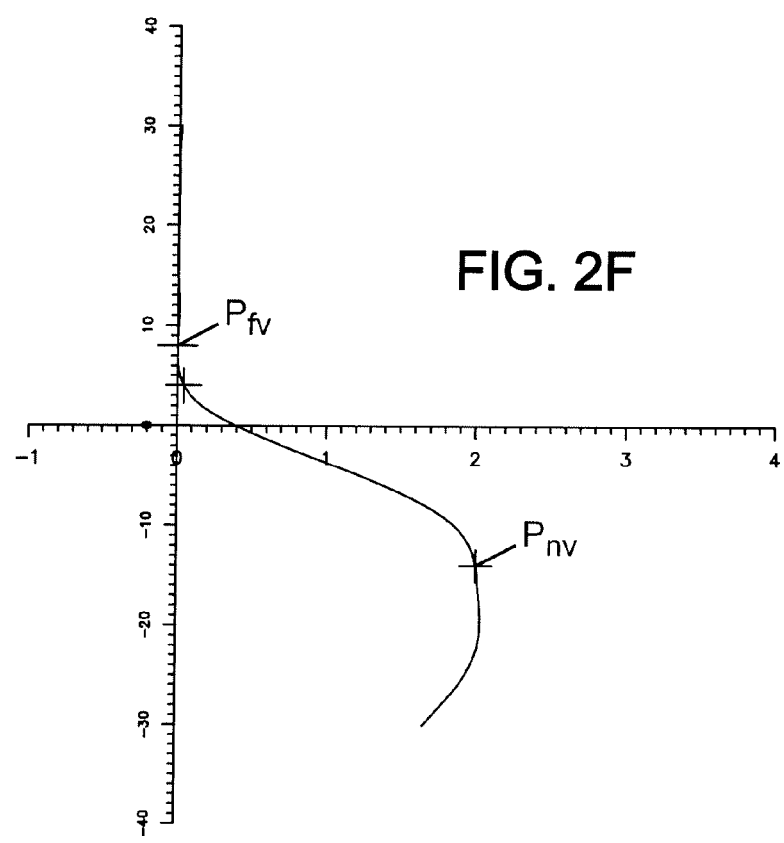
Figure 2G:
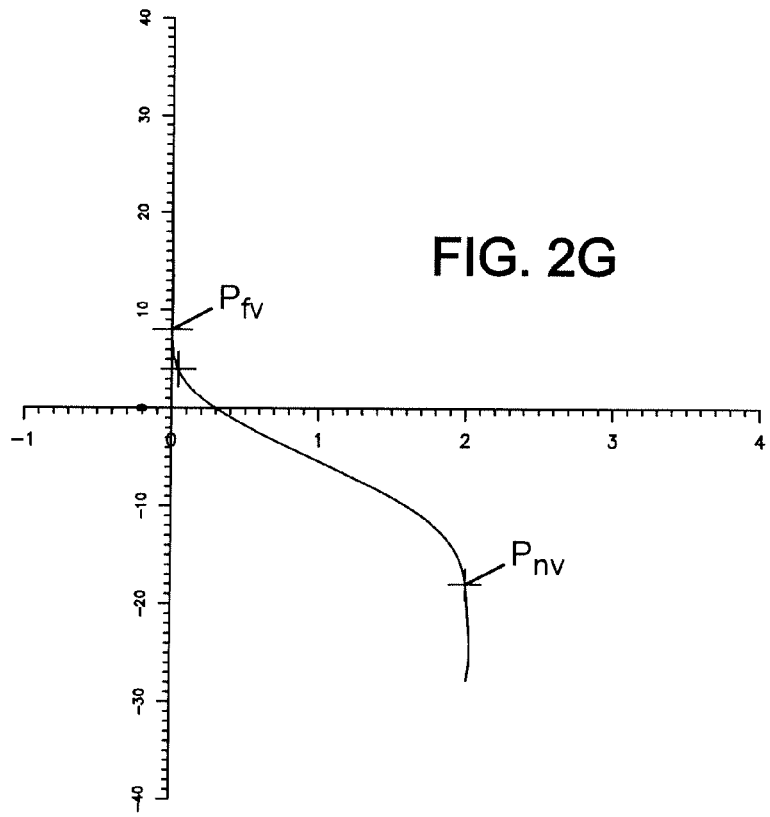
Figure 2H:
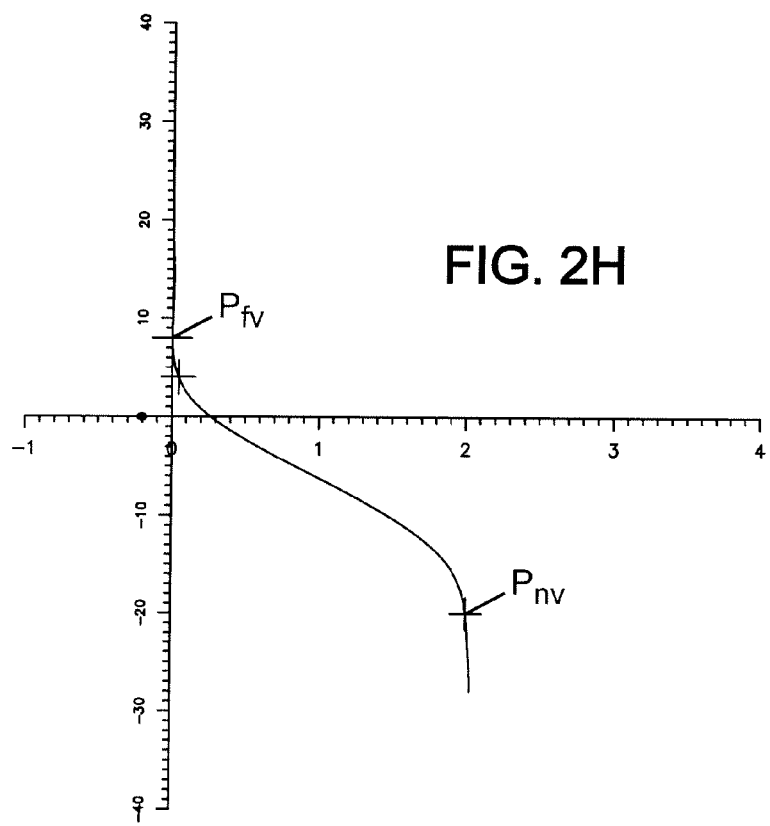

FIG. 2A represents the power profile of the initial progressive addition surface. The curve of FIG. 2A represents the power progression (in diopter) of the initial progressive addition surface along the meridian line (in mm) from the far vision zone to the near vision zone. The curve results from the continuous variation in surface curvature from the upper zone to the lower zone of the initial progressive addition surface. The power profile describes the power variation of the lens and enables the length of progression to be determined.

FIGS. 2B to 2H represent the power profile (in diopter) of the customized progressive addition surface referenced in table 1, along the meridian line (in mm).

Figure 3A:
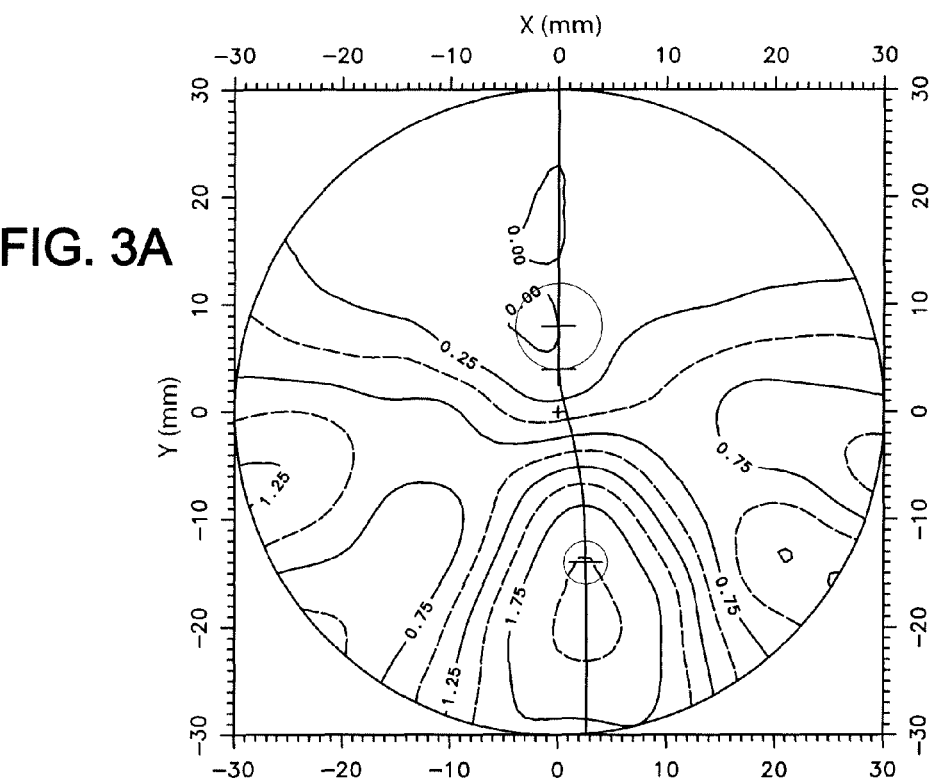
FIG. 3A is a representation of the power contour plot of the progressive addition surface of FIG. 2A.
Figure 4A:
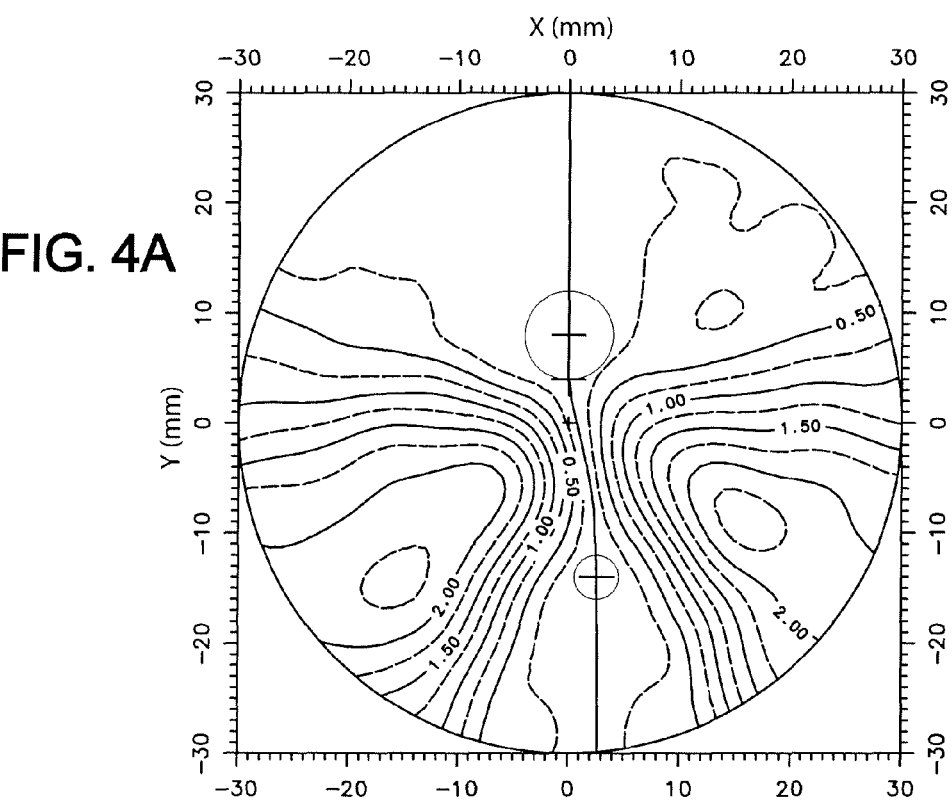
FIG. 4A is a representation of the cylinder contour plot of the progressive addition surface of FIG. 2A.

FIGS. 3A and 4A, represent respectively the power contour plot and the cylinder contour plot of the initial progressive addition surface. The plots of FIGS. 3A and 4A, are two-dimensional maps of the initial progressive addition surface representing either the distribution of power or of cylinder, as a function of the height (X axis, in mm) and the width (Y axis, in mm) of the lens. The maps show lines of equal dioptric power, iso-power or iso-cylinder. Between two consecutive lines of power the power varies by a constant amount of 0.25 D.

FIGS. 3B to 3H and 4B to 4H represent respectively the power contour plot and the cylinder contour plot of the customized progressive addition surface referenced in table 1, as a function of the height (X axis, in mm) and the width (Y axis, in mm) of the lens.

The near $P_{nv}$ and far $P_{fv}$ vision points have been reported on FIGS. 2A to 4H.

As illustrated on FIGS. 2A to 2H, the y-coordinate of the near vision point $P_{nv}$ can be customized using a method according to the invention. As illustrated on FIGS. 2A to 2H, the reference point, here the far vision point $P_{fv}$, has a constant position.

Figure 3B:
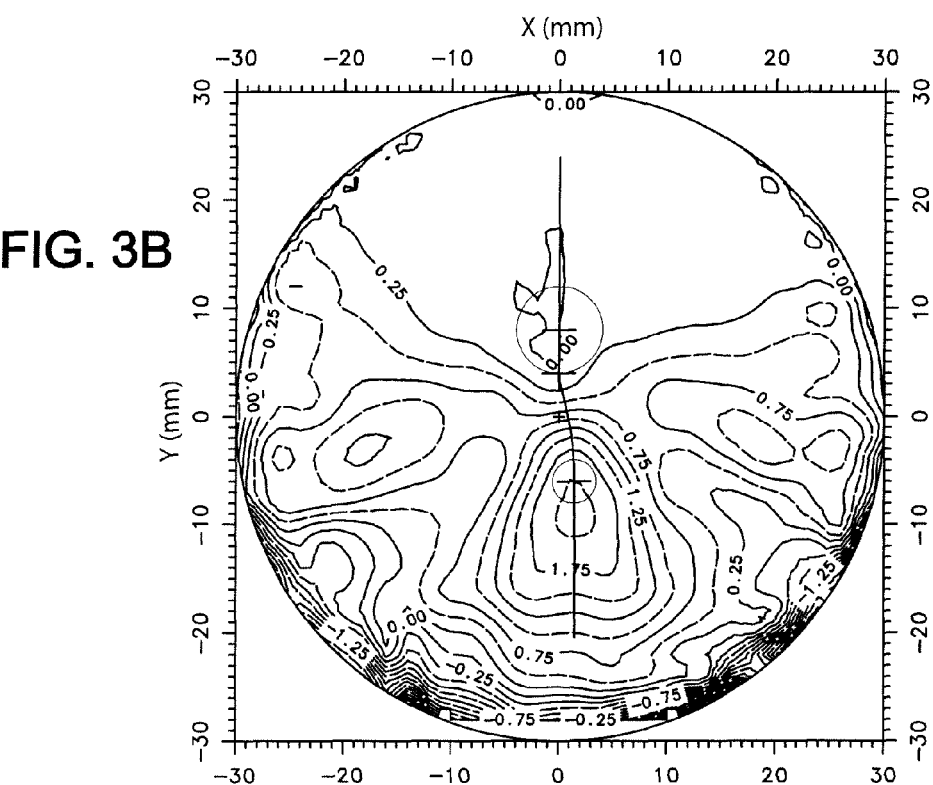
FIGS. 3B to 3H are representations of the power contour plot of customized progressive addition surfaces corresponding to respectively the progressive addition surfaces of FIG. 2B to 2H.
Figure 3C:
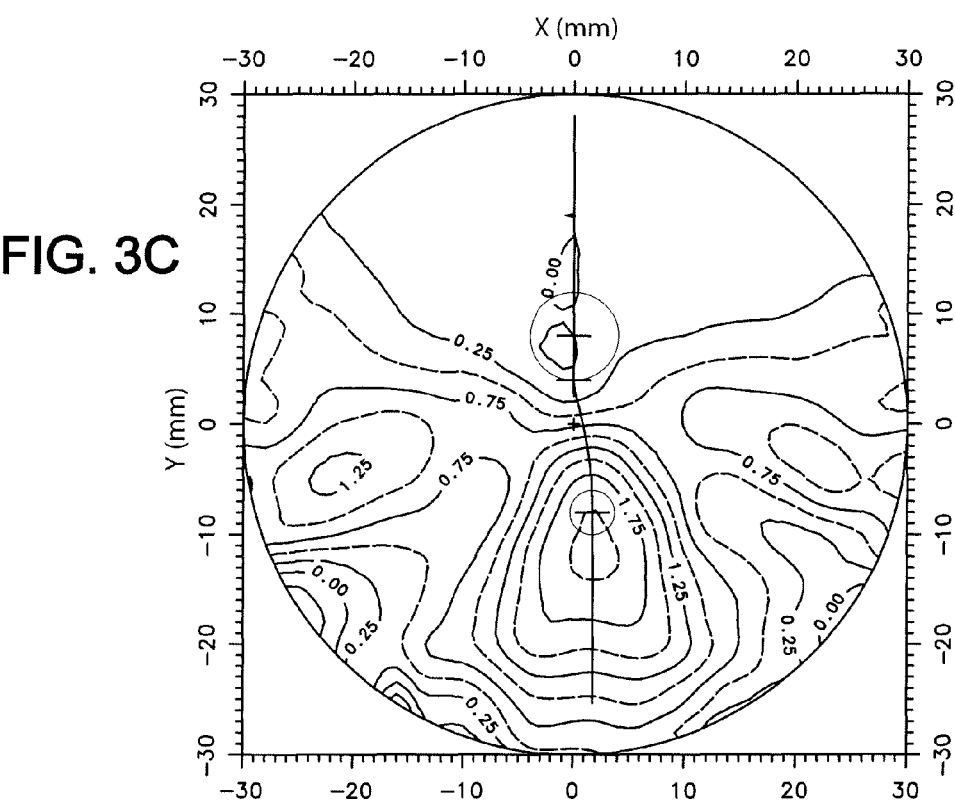
Figure 3D:
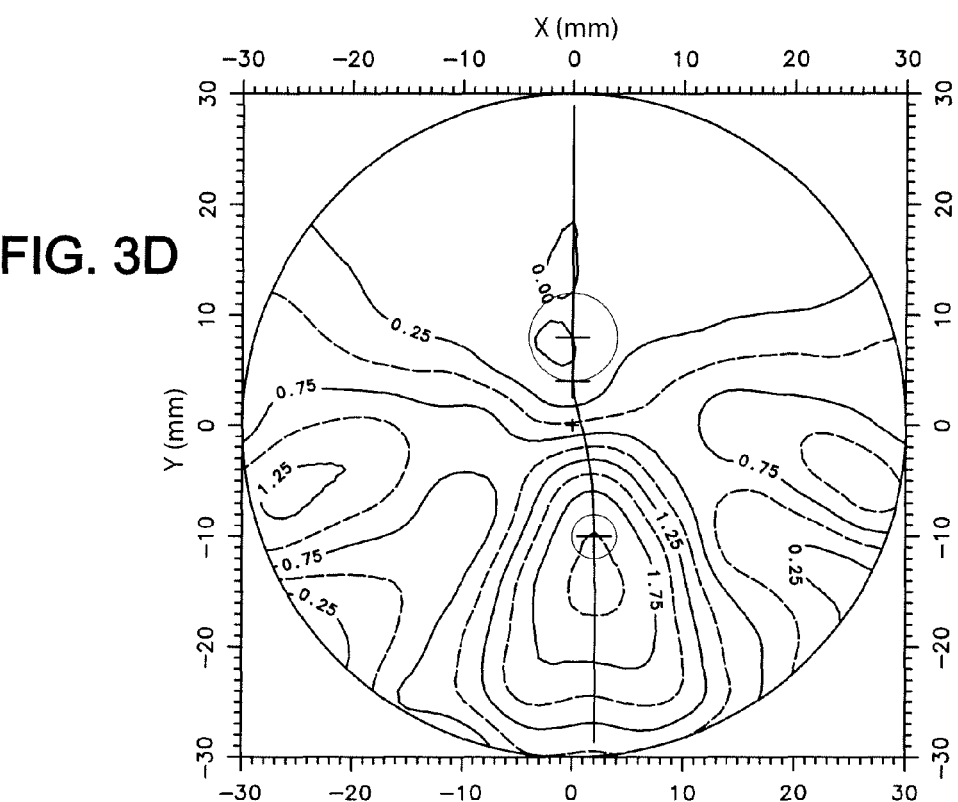
Figure 3E:
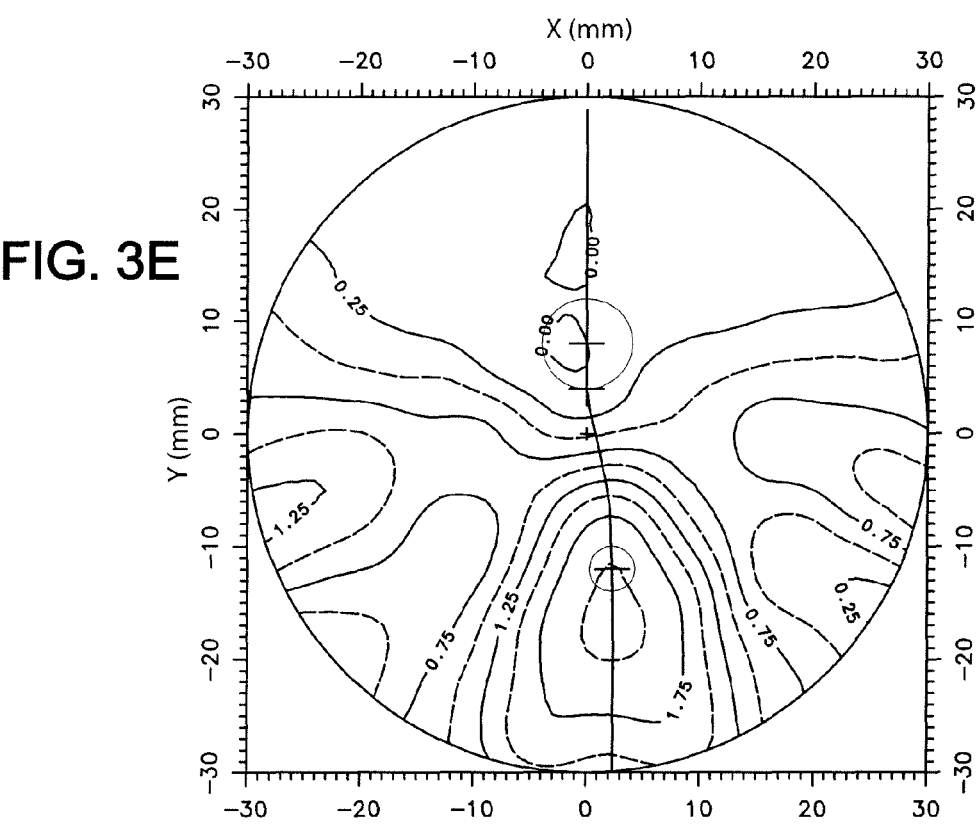
Figure 3F:
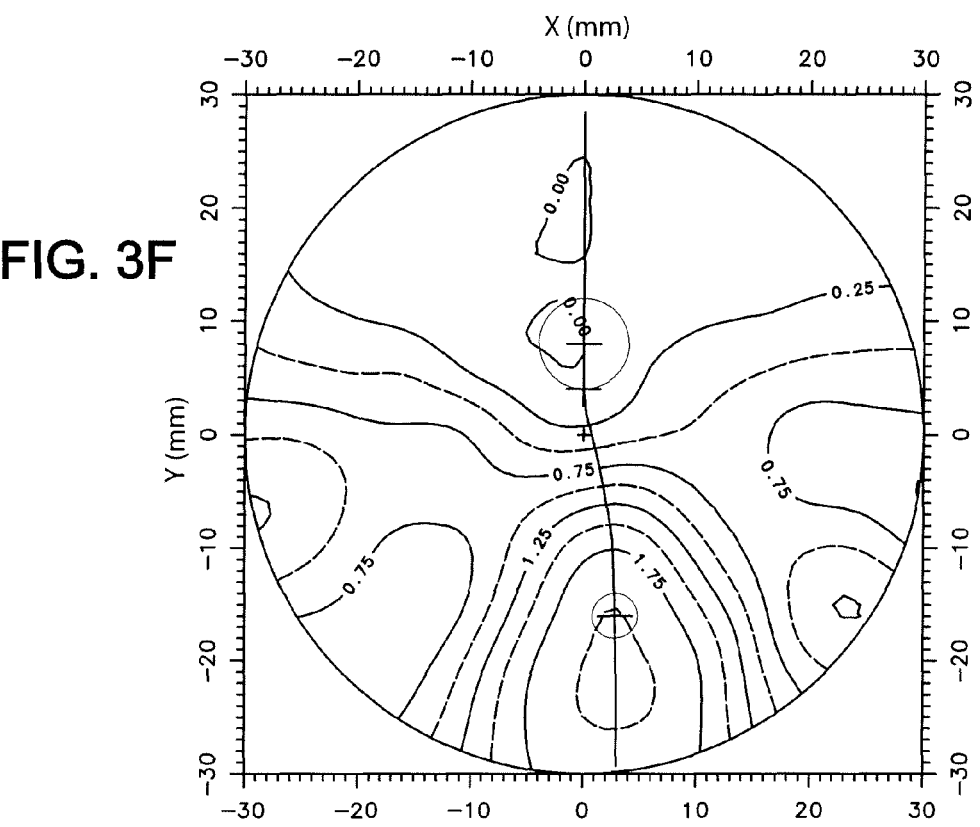
Figure 3G:
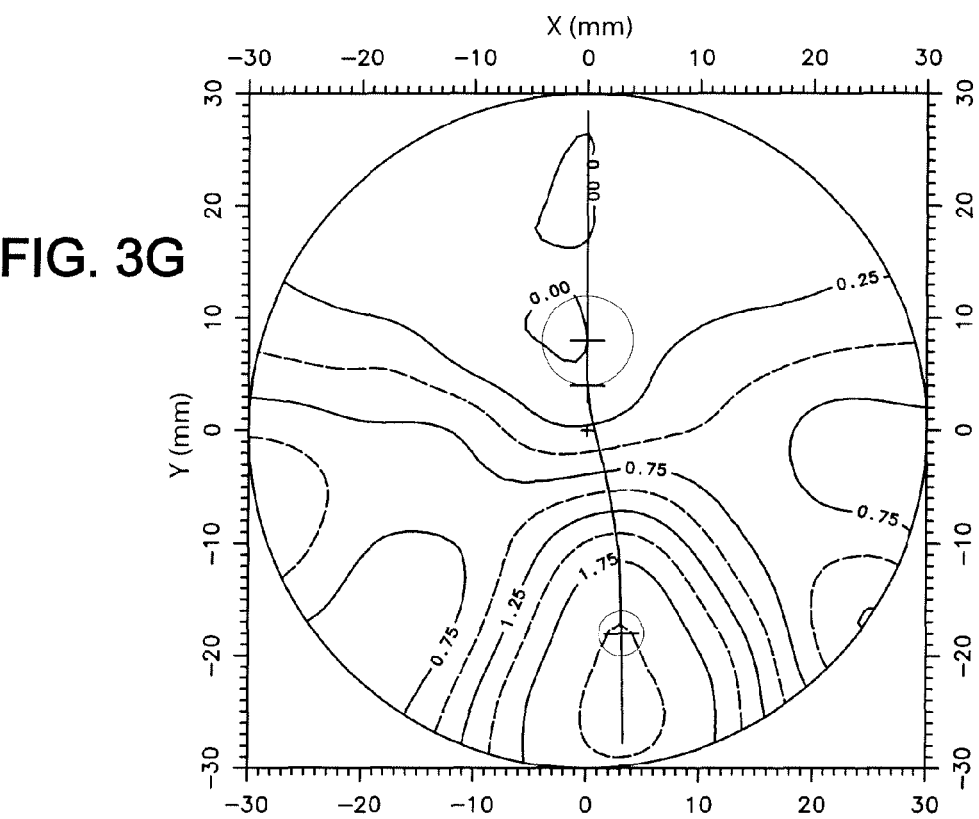
Figure 3H:
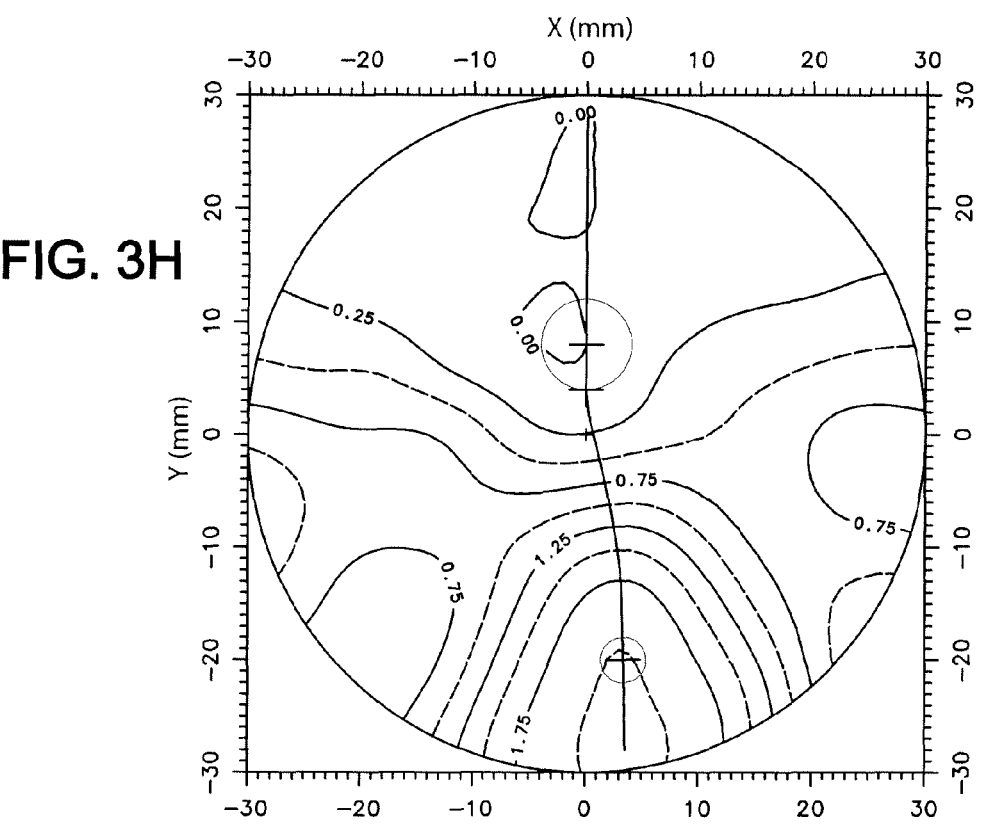

As illustrated when comparing FIG. 3A representing the power contour plot of the initial progressive addition surface with FIG. 3B representing the power contour plot of the customized progressive addition surface with the y-coordinate of the near vision point customized to −6 mm, the design of the customized progressive addition surface in the area $S_\epsilon$ corresponding to the scaling parameter ε, is similar to the design of the initial progressive addition lens.

Figure 4B:
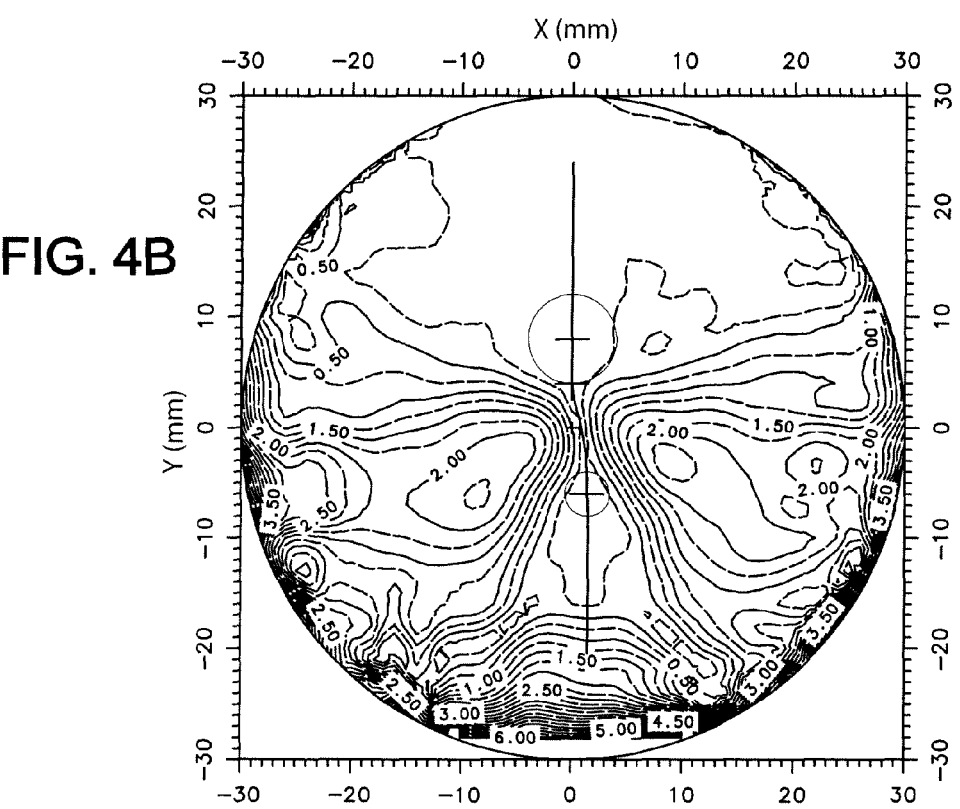
FIGS. 4B to 4H are representation of the cylinder contour plot of customized progressive addition surfaces corresponding to respectively the progressive addition surfaces of FIG. 2B to 2H.
Figure 4C:
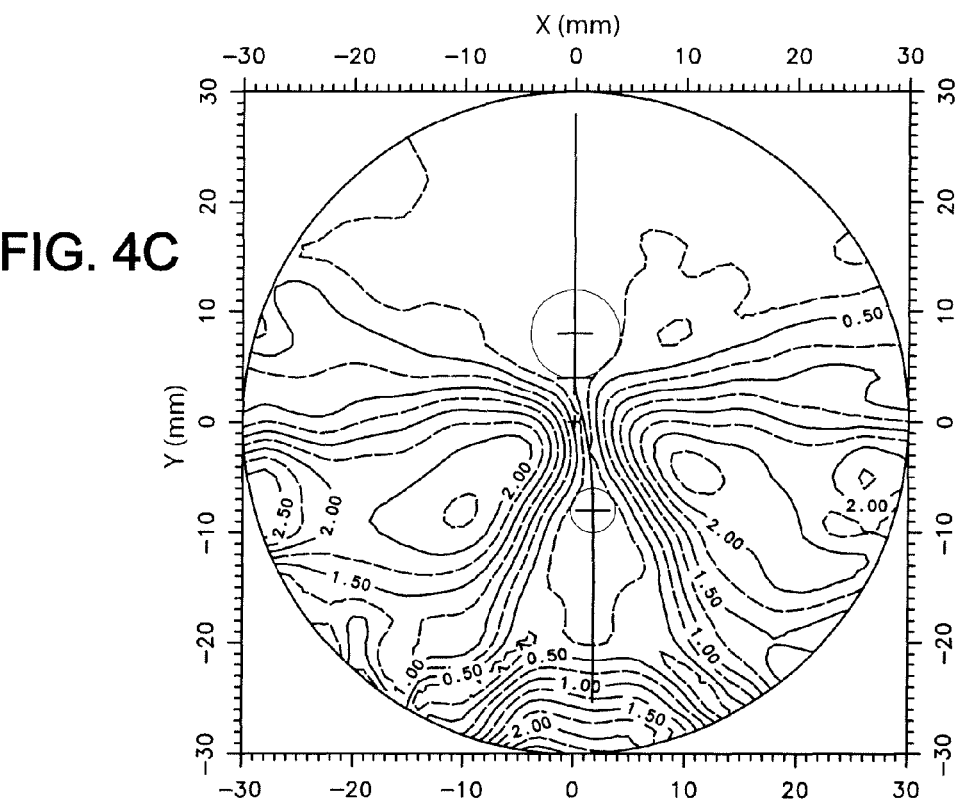
Figure 4D:
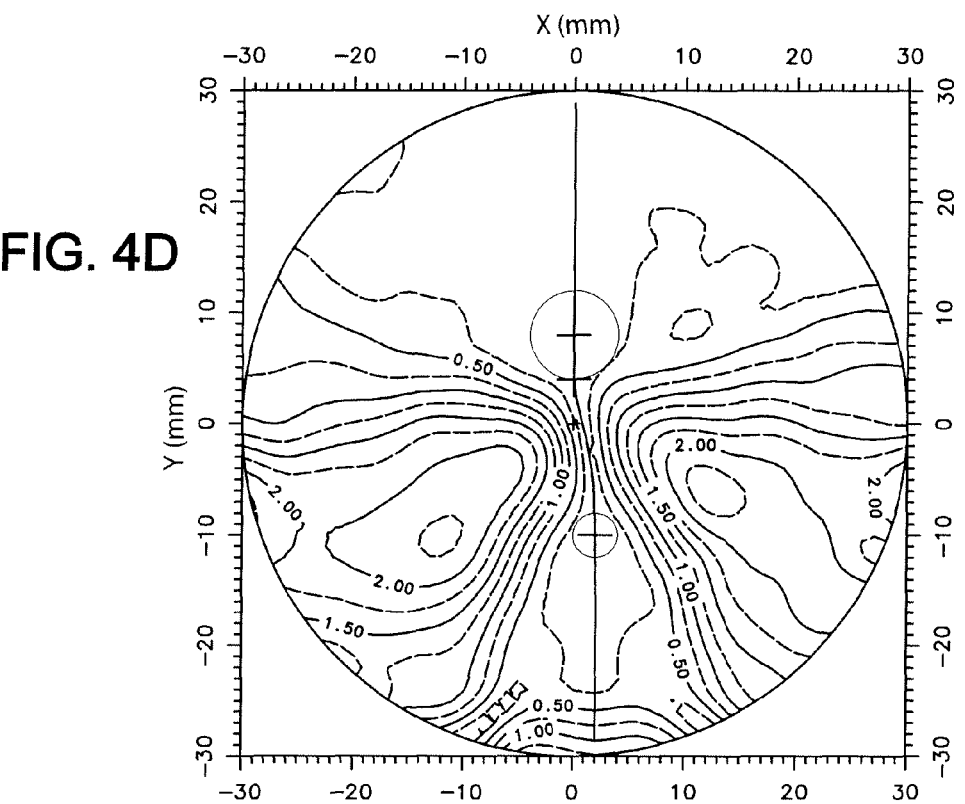
Figure 4E:
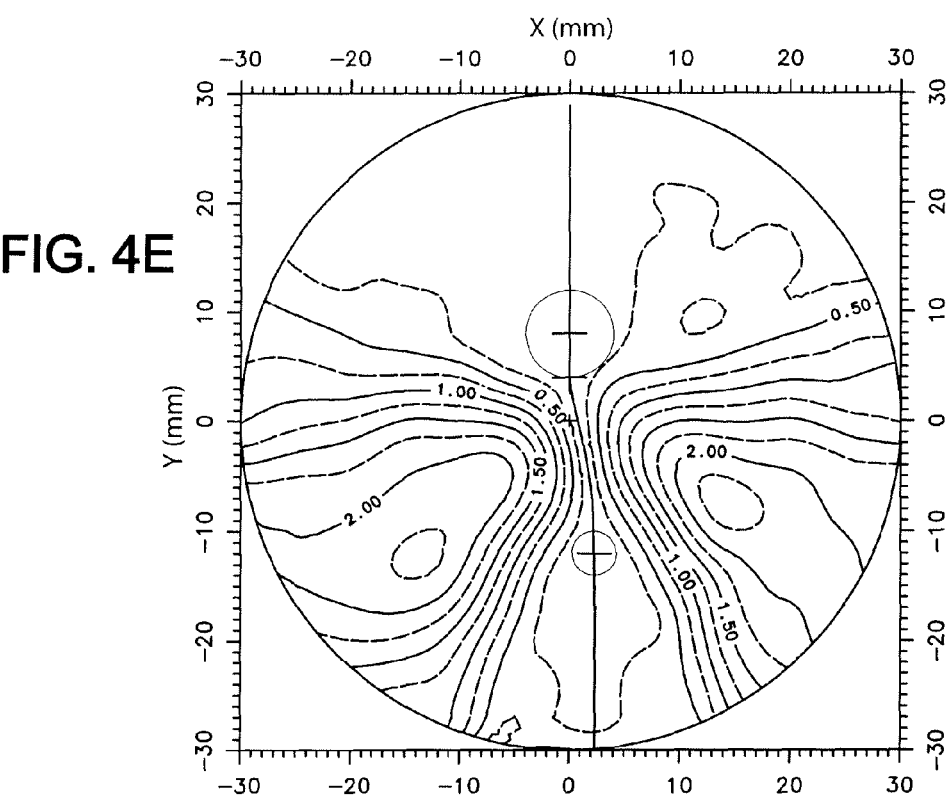
Figure 4F:
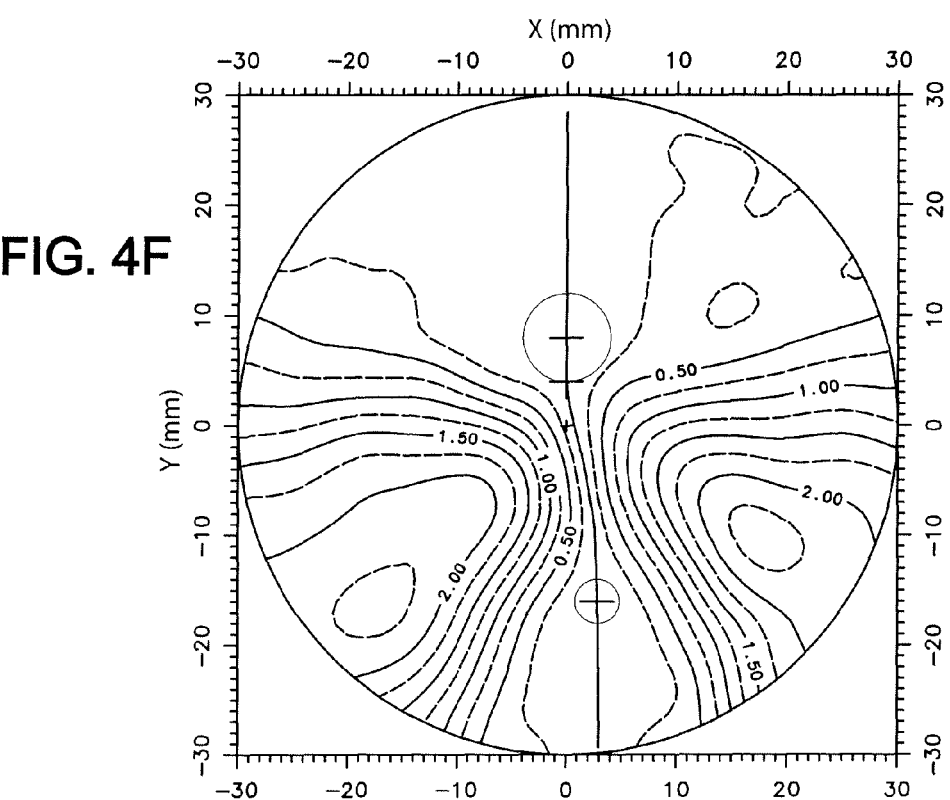
Figure 4G:
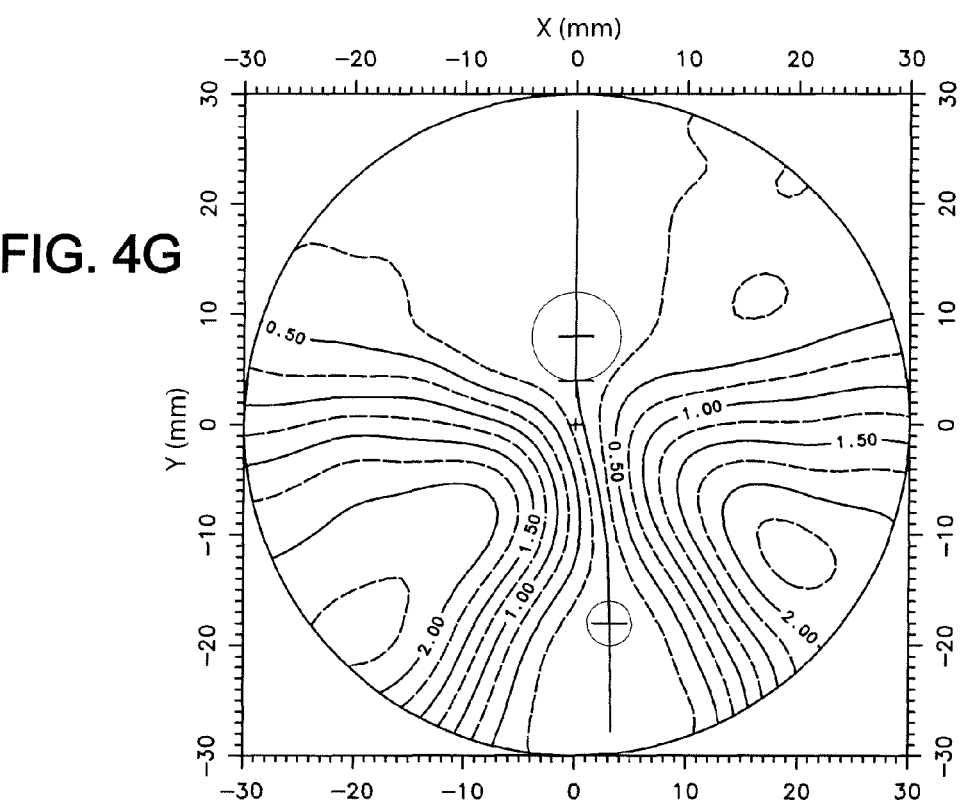
Figure 4H:
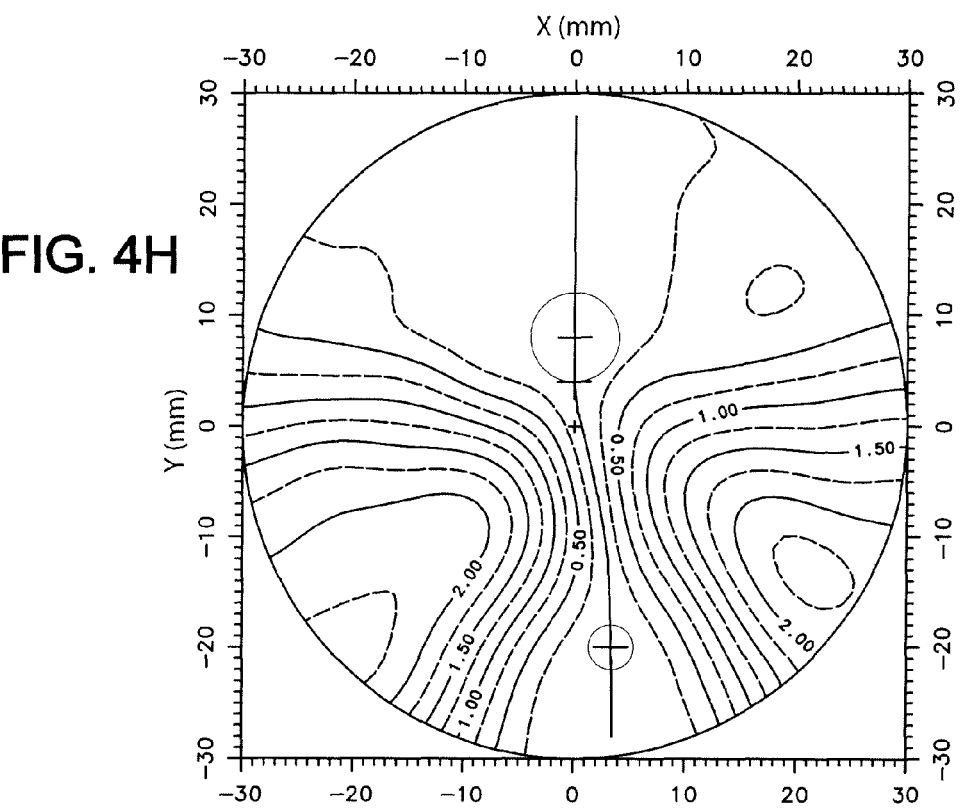

The same approach can apply to FIGS. 4A and 4B.

Therefore the method according to the invention allows customizing the position of a point of interest of an initial addition surface of a given surface design while keeping the same position for a reference point and similar surface design.

The invention also relates to a method for adjusting the length of progression of a progressive addition lens.

Indeed, the method according to the invention may be adapted to adjust the length of progression of a progressive addition lens, when the point of interest is selected as either the far vision point or the near vision point.

The invention further relates to a method for adjusting the inset of a progressive addition lens.

Indeed, the method according to the invention may be adapted to adjust the inset by selecting the point of interest either as the far vision point or the near vision point.

The invention further relates to a method for calculating an optical system, wherein the optical system is identified by an optical function, at least two optical surfaces comprise a first optical surface defined by a first equation and a second optical surface defined by a second equation, the optimization step further comprises:

a generating step, in which a virtual optical system is used to generate a virtual function;

a modification step, in which the virtual function is modified so as to obtain the function;

a calculation step, in which the second equation is calculated from the function, and the first equation, one of the first or second optical surfaces is a customized progressive addition surface S'" calculated according to a customizing method of the invention.

Advantageously, the method for calculating an optical system according to the invention allows customizing a selected surface design according to the requirement of the wearer.

The invention also relates to an ophthalmic lens manufacturing method comprising the steps of:

receiving a progressive addition lens surface, calculating an optical system according to the invention, manufacturing an ophthalmic lens having the calculated optical system.

The manufacturing method according to the invention may be processed by direct surfacing, digital surfacing, grounding or any manufacturing method suitable for an progressive addition lens known for the man skilled in the art.

The invention has been described above with the held of embodiments without limitation of the general inventive concept, in particular the coordinate system is not limited to the example discussed. In particular, method according to the invention is not limited to one point of interest, and the point of interest is not limited to the examples discussed. In particular, the invention has been described in relation with progressive positive addition lenses but it may be adapted for progressive negative addition lenses.

The invention claimed is:

1. A computer implemented method for calculating, using a processor, a customized progressive addition surface S'" of a progressive addition lens (PAL) made of a material having an optical index of n, the method, comprising at least the successive steps of:

a) providing N initial progressive addition surfaces where $N \geq 1$, each initial progressive addition surface, $S_k$, where $1 \leq k \leq N$, being provided with characteristic data comprising:

$M_k$ points, $P_{k,i}$, where $1 \leq i \leq M_k$, the sphere $Sph(P_{k,i})$, the cylinder $Cyl(P_{k,i})$ and the axe $Axe(P_{k,i})$ at each point $P_{k,i}$ the near vision point $P_{k,nv}$, and the far vision point $P_{k,fv}$, and selecting for each initial progressive addition surface $S_k$ a reference point $P_{k,r}$ among the $M_k$ points $P_{k,i}$ of each initial progressive addition surface, b) calculating, by the processor, N intermediate surfaces $S'_k$ by flattening each initial progressive addition surfaces $S_k$ so as to have for each intermediate surface $S'_k$ the value of the Sphere $Sph(P_{k,fv})$ at the far vision point smaller or equal to 1 diopter and the Sphere $Sph(P_{k,nv})$ at the near vision point smaller or equal to 1 diopter, c) calculating, by the processor, a transformed intermediate surface S" by applying $$S''(P_i) = \sum_{k=1}^{N} \alpha_k T_{P_{k,r}; \varepsilon_k}(S'_k(P_{i,k})),$$

where $T_{P_{k,r}; \varepsilon_k}$ is an isotropic function applied to each point $P_{k,i}$ of each intermediate surface $S'_k$ and $\alpha_k$ a coefficient specific to each intermediate surface $S'_k$, each isotropic function $T_{P_{k,r}; \varepsilon_k}$ is defined by the selected reference point $P_{k,r}$ of the intermediate surface $S'_k$, and a scaling parameter $\varepsilon_k$, with $\varepsilon_k \neq 1$ when N=1, d) calculating, by the processor, the customized progressive addition surface S''' by cambering the transformed intermediate surface S" so as to have the desired value of the sphere in at least two points of the customized surface S'''.

2. The method according to claim 1, wherein step b) is processed by calculating, by the processor, N intermediate surfaces $S'_k$ from the triples $(Sph'(P_{k,i}); Cyl'(P_{k,i}); Axe'(P_{k,i}))$, where $Sph'(P_{k,i})$, $Cyl'(P_{k,i})$, $Axe'(P_{k,i})$, are the values of the sphere, the cylinder and the axe at each point $P_{k,i}$ of each intermediate surface $S'_k$, and are calculated according to:

$Sph'(P_{k,i}) = a_k * Sph(P_{k,i}) + b_k$ $Cyl'(P_{k,i}) = a_k * Cyl(P_{k,i})$ $Axe'(P_{k,i}) = Axe(P_{k,i})$, where the requirements of equations (1) and (2) are fulfilled for each intermediate surface $S'_k$:

$$0 < a_k \leq \frac{1}{Sph(P_{k,fv}) - Sph(P_{k,nv})}, \quad (1)$$

where $Sph(P_{k,nv})$ and $Sph(P_{k,fv})$ represent the values of the sphere of each initial progressive addition surface $S_k$ at the near vision point $P_{k,nv}$ and at the far vision point $P_{k,fv}$, and $-\alpha_k * Sph(P_{k,fv}) < b_k \leq 2 - \alpha_k * Sph(P_{k,fv})$ (2).

3. The method according to claim 1, wherein step d) is processed by calculating, by the processor, the customized progressive addition surface S''' from the triples $(Sph'''(P_i); Cyl'''(P_i); Axe'''(P_i))$, where $Sph'''(P_i)$, $Cyl'''(P_i)$ and $Axe'''(P_i)$ are the values of the sphere, the cylinder and the axe of each point $P_i$ of the customized progressive addition surface S''', and are calculated according to:

$Sph'''(P_i) = c * Sph''(P_i) + d$ $Cyl'''(P_i) = c * Cyl''(P_i)$ $Axe'''(P_i) = Axe''(P_i)$, where c and d are constants chosen so to have the desired value of the sphere in at least two points of the customized surface S'''.

4. The method according to claim 1, wherein at least one of the isotropic function $T_{P_{k,r}; \varepsilon_k}$ is selected so as to have:

$$T_{P_{k,r}; \varepsilon_k}(S'_k(P_{i,k})) = S'_k(\varepsilon_k(x_k - x_{k,r}) + x_{k,r}, \varepsilon_k(y_k - y_{k,r}) + y_{k,r}) / \varepsilon_k^2$$

where each point $(x_k, y_k)$ and the reference point $(x_{k,r}, y_{k,r})$ of each intermediate surface $S'_k(x_k, y_k)$, and each point of the transformed intermediate surface $S''_k(x_k, y_k)$ are expressed in a Cartesian coordinate system.

5. The method according to claim 1, wherein the constant c and d are selected so as to have the value of the sphere of the customized progressive addition surface S''' at the near and far vision points equal to desired values.

6. The method according to claim 1, wherein N initial progressive addition surfaces are provided with N>1, and wherein every scaling parameter $\varepsilon_k = 1$.

7. The method according to claim 1, wherein only one initial progressive addition lens surface S is provided, the initial progressive addition lens surface is provided with at least a point of interest POI.

8. The method according to claim 7, wherein the scaling parameter $\varepsilon$ is calculated, by the processor, according to $$\varepsilon = \frac{(w_r - w'_{poi})}{(w_r - w''_{poi})},$$

with $w_r$ the position of the reference point $P_r$ according to a w-axis, $W_{poi}'$ the position according to the w-axis of the point of interest POI on the intermediate lens surface and $W_{poi}''$ w the customized position according to the w-axis of the point of interest POI on the transformed intermediate surface.

9. The method according to claim 7, wherein the point of interest is chosen from the list comprising the far vision point, the near vision point, the fitting cross, the prism reference point.

10. The method according to claim 7, wherein the point of interest is the far vision point and the reference point is the near vision point or the point of interest is the near vision point and the reference point is the far vision point.

11. A method for adjusting the length of progression of a progressive addition lens comprising the method of claim 7, wherein the point of interest is either the far vision point or the near vision point.

12. A method for adjusting the inset of a progressive addition lens comprising the method of claim 7, wherein the point of interest is either the far vision point or the near vision point.

13. A computer implemented method for calculating an optical system using a processor, wherein the optical system is identified by an optical function, at least two optical surfaces comprise a first optical surface defined by a first equation and a second optical surface defined by a second equation, the optimization step further comprises:

a generating step, in which a virtual optical system is used by the processor to generate a virtual function;

a modification step, in which the virtual function is modified by the processor so as to obtain the function;

a calculation step, in which the second equation is calculated by the processor from the function, and the first equation, wherein one of the first or second optical surfaces is a customized progressive addition surface S''' calculated according to claim 1.

14. An ophthalmic lens manufacturing method comprising the steps of:

receiving a progressive addition lens surface, calculating an optical system according to claim 13, and manufacturing an ophthalmic lens having the calculated optical system.

15. A non-transitory computer program product comprising one or more stored sequence of instruction that is accessible to a processor and which, when executed by the processor, causes the processor to carry out the steps of claim 1.

16. A non-transitory computer readable medium carrying one or more sequences of instructions of the computer program product of claim 15.

\* \* \* \* \*